United States Patent [19]

Flocchini

[11] 4,185,586

[45] Jan. 29, 1980

[54] MILK SENSOR FOR MACHINE REMOVER

[76] Inventor: Andrew J. Flocchini, 7050 Lakeville Hwy., Petaluma, Calif. 94952

[21] Appl. No.: 847,290

[22] Filed: Oct. 31, 1977

[51] Int. Cl.² ............................................. A01J 5/04
[52] U.S. Cl. ............................ 119/14.08; 119/14.15
[58] Field of Search ............ 119/14.15, 14.08, 14.41, 119/14.46; 138/42, 43; 239/542; 137/630.15

[56] References Cited

U.S. PATENT DOCUMENTS

| | | | |
|---|---|---|---|
| 3,786,782 | 1/1974 | Abrahamson et al. | 119/14.08 |
| 3,995,664 | 12/1976 | Nelson | 138/42 |

*Primary Examiner*—Hugh R. Chamblee
*Attorney, Agent, or Firm*—Townsend and Townsend

[57] ABSTRACT

A metering device for use in connection with an automatic milking machine is disclosed. The metering device includes a bottom metering drain and conventional overflow. Dependent upon milk level, a float is provided which moves between an upper machine "on" position during full milk flow and a lower machine "off" position when the milk flow ceases. The movement of the float activates a magnetic reed switch. An improvement is made to the bottom metering drain in which a first metering disc having a metering aperture allowing milk flow through the aperture overlies a cylindrical indentation in the bottom wall of the chamber. A second disc overlies the first disc. The lower surface of the second disc has a peripheral annular ridge which extends downwardly below the lowest point on the lower surface. The ridge is notched at several locations so that a plurality of orifices result when the ridge confronts the aperture plate. Each of these orifices is approximately half the size of the metering aperture in the lower disc. The relative smallness of these orifices prevents any particles from passing through and plugging the metering aperture. The large number of these orifices allows a substantially larger flow than does the metering aperture so that the metering aperture is the primary limiting factor and particle clogging cannot occur. Cleaning the device is accomplished by moving the respective discs apart from each other by an upward movement of an axially extending rod, which rod is also the guide for the float movement and contains the reed switch.

3 Claims, 5 Drawing Figures

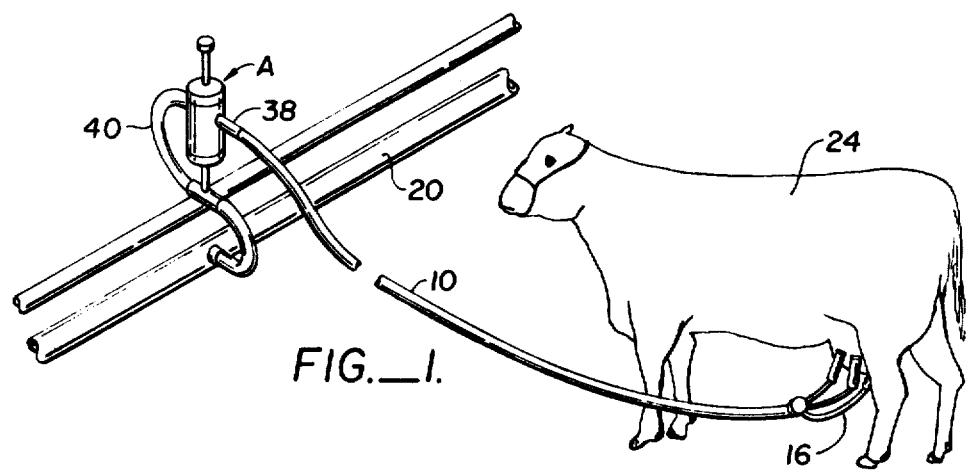
FIG.—1.
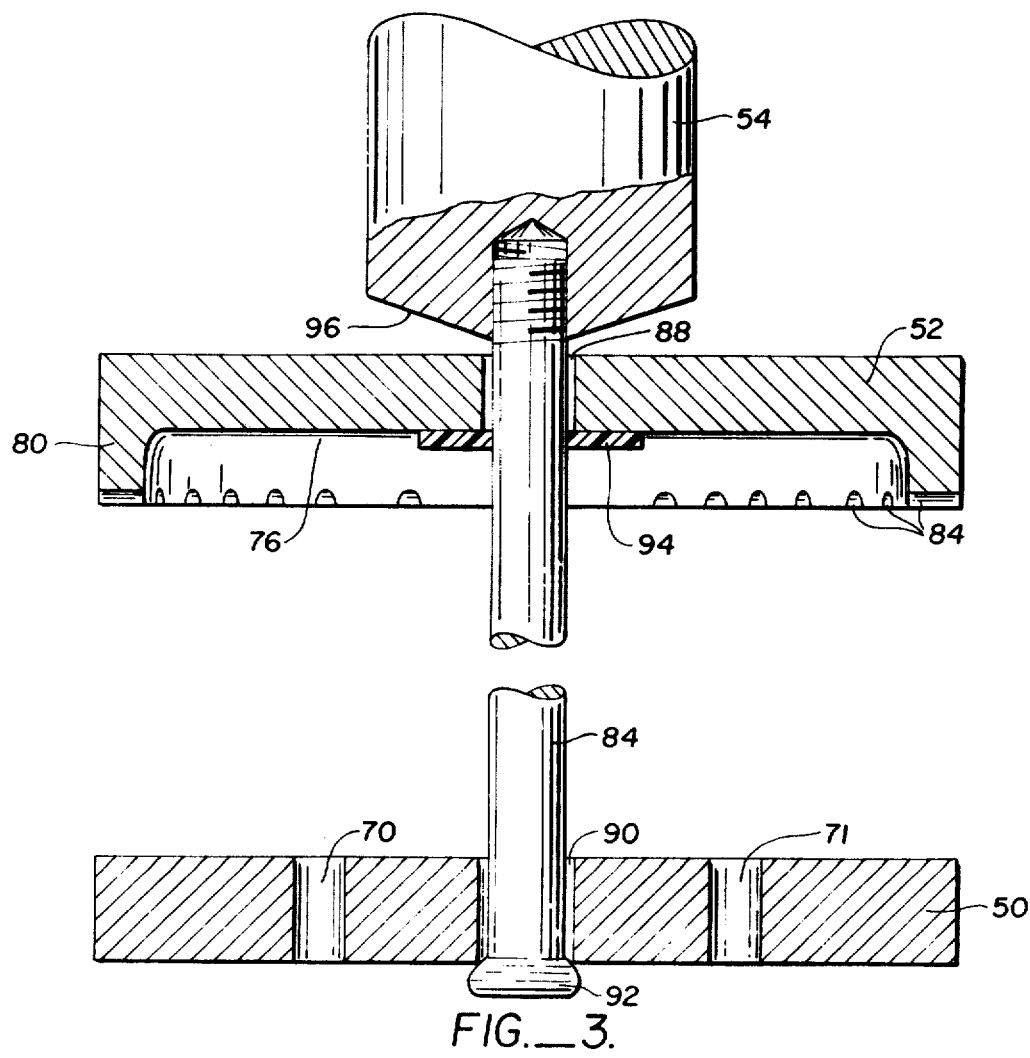
FIG.—3.

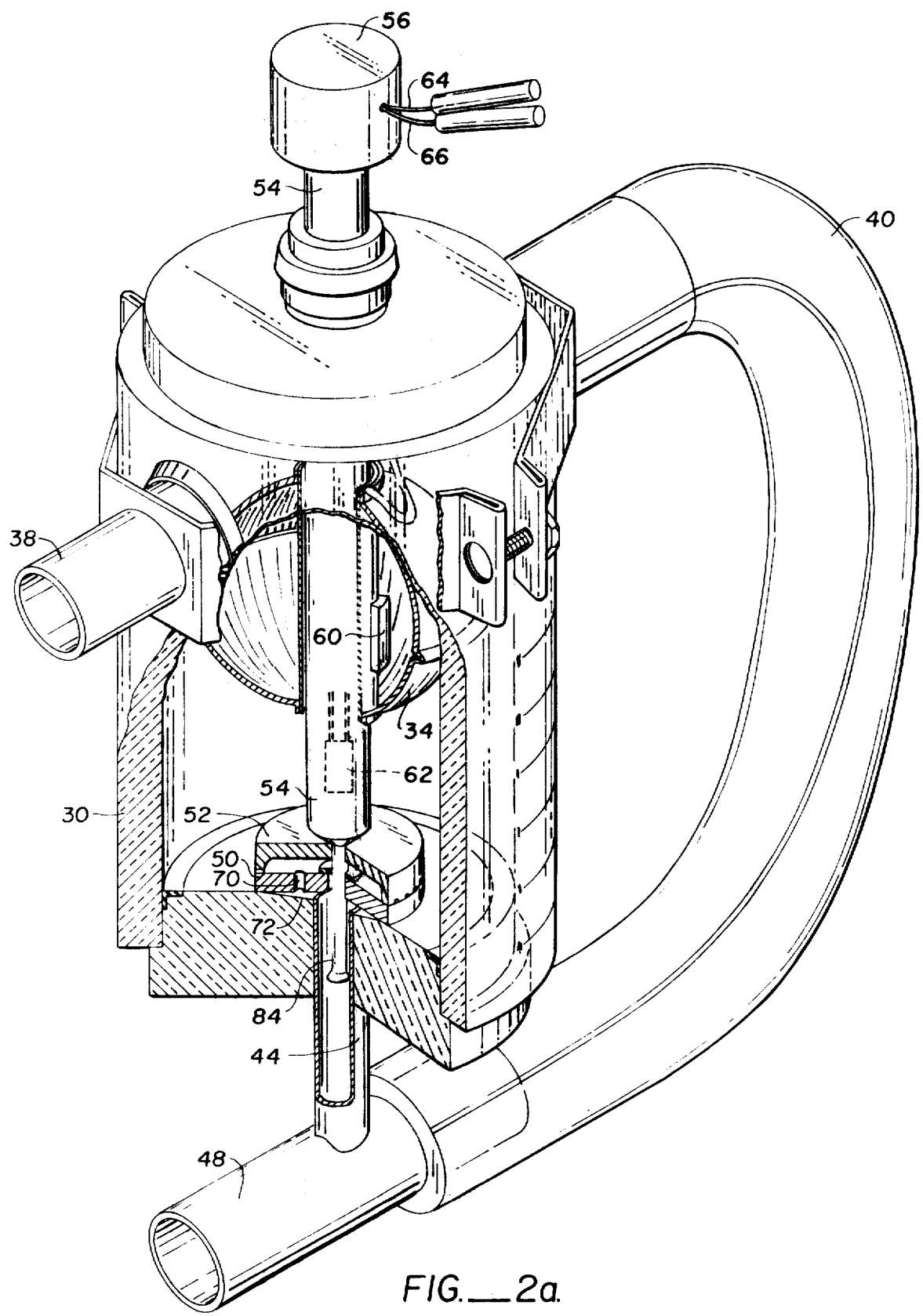
FIG._2a.

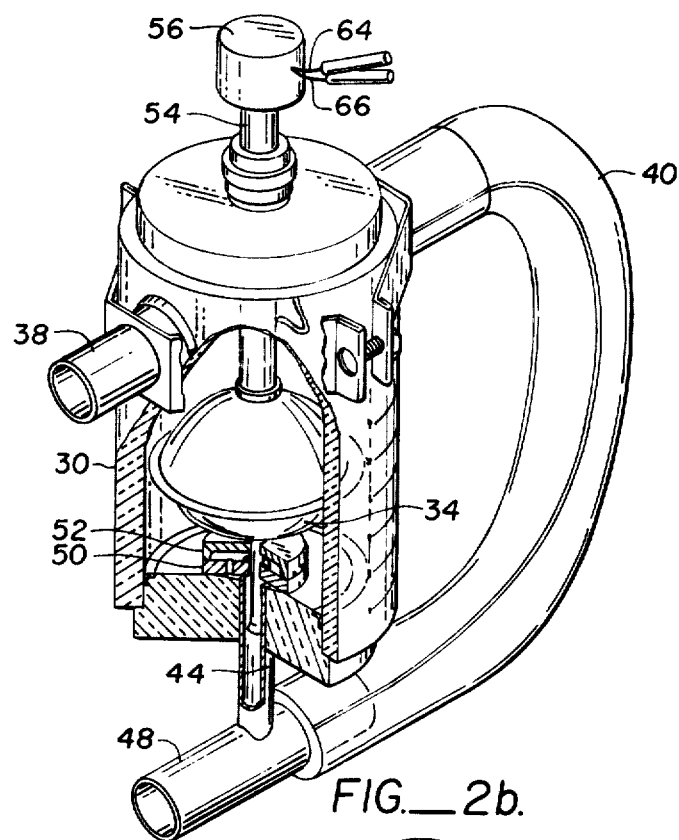
FIG.__2b.
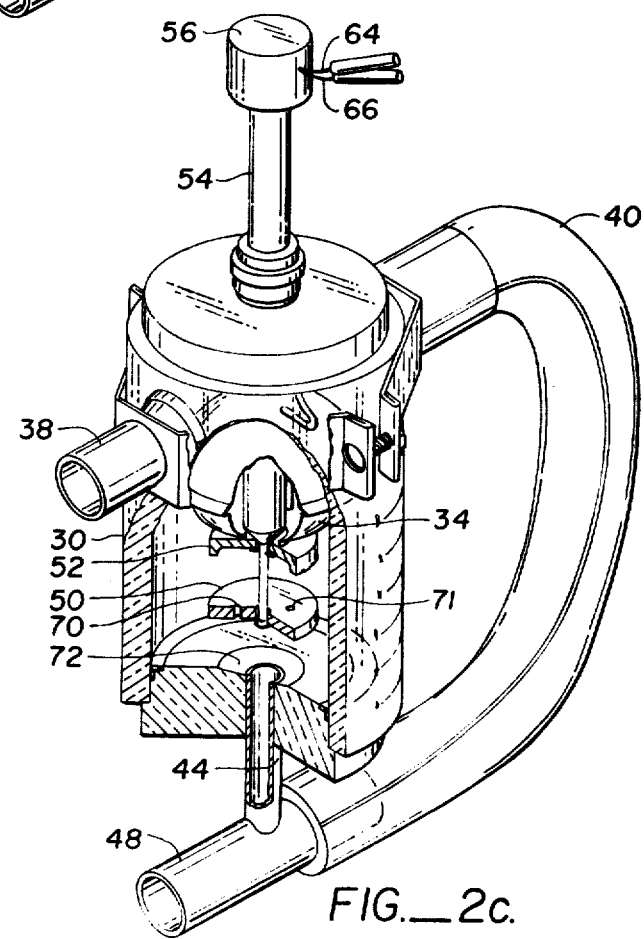
FIG.__2c.

MILK SENSOR FOR MACHINE REMOVER

STATEMENT OF THE PROBLEM

Milk metering devices are known. Such devices typically include a chamber and float. The chamber leaks at a preprogrammed rate through a small metering aperture in the bottom. The float will typically remain in a high position when flow from the cow is at least that occurring through the metering aperture and a low position when the cow's flow is less. Means are provided to sense the position of the float and cause milking to cease when the float is in the low position. The chamber is provided with an overflow so that when the flow from the cow's bag exceeds that passing through the metering aperture, overflow of milk to the dairy vacuum manifold occurs.

Such prior art metering devices are not without disadvantages. First and most common, the small metering aperture can become plugged. When this occurs, the chamber cannot drain, the float remains at its topmost position and milking continues, even after there is no milk to be taken from the cow. Overmilking often leads to mastitis and various other organic problems which usually lead to premature slaughtering of an otherwise valuable dairy animal.

Small metering apertures present an additional difficult when it is desired to clean them. The flow of cleansing water through normal devices after milking is frequently insufficient to wash and purge the device of milk remnants. Unsanitary conditions result. Often, the only way to effect proper cleaning is to thoroughly disassemble the unit.

SUMMARY OF THE INVENTION

A metering device for use in connection with an automatic milking machine is disclosed. The metering device includes a bottom metering drain and conventional overflow. Dependent upon milk level, a float is provided which moves between an upper machine "on" position during full milk flow and a lower machine "off" position when the milk flow ceases. The movement of the float activates a magnetic reed switch. An improvement is made to the bottom metering drain in which a first metering disc having a metering aperture allowing milk flow through the aperture overlies a cylindrical indentation in the bottom wall of the chamber. A second disc overlies the first disc. The lower surface of the second disc has a peripheral annular ridge which extends downwardly below the lowest point on the lower surface. The ridge is notched at several locations so that a plurality of orifices result when the ridge confronts the aperture plate. Each of these orifices is approximately half the size of the metering aperture in the lower disc. The relative smallness of these orifices prevents any particles from passing through and plugging the metering aperture. The large number of these orifices allows a substantially larger flow than does the metering aperture so that the metering aperture is the primary limiting factor and particle clogging cannot occur. Cleaning the device is accomplished by moving the respective discs apart from each other by an upward movement of an axially extending rod, which rod is also the guide for the float movement and contains the reed switch.

OTHER OBJECTS AND ADVANTAGES OF THE INVENTION

An object of this invention is to disclose and improved metering orifice. The bottom of a milk chamber has its outflow closed by a disc with the metering aperture therein. A second disc having its undersurface surrounded by a peripherial annular downwardly extending ridge overlies and confronts the first disc. The annular ridge is notched in several locations. Milk flow to the first disc occurs through the plurality of orifices that are defined when the peripheral annular ridge confronts the first disc. These orifices are of the order of one-half the cross-sectional area of the metering aperture. Particle plugging of one orifice permits flow through the remaining apertures with resultant flow out of the chamber still limited primarily by the metering aperture.

An advantage of this aspect of the invention is that the notched annular peripheral rim forms an inlet manifold with a plurality of small openings. The plugging of one of these openings allows flow through the other openings. The result is that metering is substantially unimpaired.

Yet another object of this invention is to disclose a milk metering device which is capable of being cleaned more thoroughly than prior art devices. According to this aspect of the invention, a reciprocating rod including the reed switch and float assembly is mounted coaxially with the discs and extending downwardly beyond them. Moving the rod upwardly lifts and separates the discs. In this raised position, both sides of both discs and the large underlying aperture bottom of the float chamber are exposed so that high velocity water flow with turbulent cleansing through the chamber can occur.

An advantage of this aspect of the invention is that the accommodation of high water flow through the chamber enables cleansing of all parts within the chamber to occur. Unsanitary conditions are thus minimized.

A further advantage of this invention is that during the cleaning mode, the two metering discs are facially separated from each other. Thus, all of the orifice surfaces are exposed to the water flow for more effective cleaning.

Yet another advantage of this invention is that the metering apertures and chamber can be cleaned without having to disassemble the unit.

Other objects, features and advantages of this invention will become mroe apparent after referring to the following specification and attached drawings.

BRIEF DESCRIPTION OF THE DRAWINGS

FIG. 1 is a schematic view showing the placement of the milk metering apparatus within a milking claw and teat cup assembly;

FIG. 2a is a side elevation perspective of the milk metering apparatus with the disc partially broken away to illustrate the action of the device when full of milk;

FIG. 2b is a view identical to FIG. 2a showing the device empty of milk with the reed switch being actuated for shutting down the teat cup vacuum;

FIG. 2c is a view identical to FIG. 2a showing the apparatus in the cleaning position; and FIG. 3 is a detail illustrating the attachments of the pair of metering discs to the reciprocating rod.

DETAILED DESCRIPTION OF THE DRAWINGS

In FIG. 1, metering device A is shown inserted in milk line 10 which runs from teat cup assembly 16 to milk manifold 20. Teat cup assembly 16 is connected to cow 24.

The purpose of metering device A is to determine when milk flow from cow 24 has fallen below a certain level, at which point milking is automatically ceased. This device may be used in conjunction with an automated milking assembly such as that disclosed in my U.S. Pat. No. 3,973,520. FIG. 2a is a cutaway view of metering device A, which, broadly, comprises float chamber 30, float 34, intake conduit 38, overflow 40, metering drain 44, and outflow 48. During milking, milk flows through intake 38, into chamber 30, through metering drain 44, and out outflow 48 to milk manifold 20. Metering discs 50 and 52, which constitute the main improvement of this invention, are disposed over metering drain 44 and serve to define the maximum flow that can occur through drain 44. Float 34 is capable of movement along vertical guide rod 54 in response to the level of milk in chamber 30. Guide rod 54 extends through the top of the chamber, terminating in handle 56.

FLOAT POSITION

When float 34 is at its lowest position, as shown in FIG. 2b, reed switch 62 mounted inside guide rod 54 is closed by magnet 60 mounted inside float 34. When milk flow through intake conduit 38 in excess of flow possible through metering disc 50 and 52 is established, chamber 30 begins to fill with milk. Float 34 begins to rise in response to this, and reed switch 62 is opened. The state of reed switch 62 is communicated to external circuitry of a type previously known through wires 64 and 66 which extend upward through vertical rod 54 and out of handle 56. When chamber 30 is full to the level of overflow conduit 40, any milk flow from intake conduit 38 that exceeds the flow possible through metering discs 50 and 52 passes through overflow conduit 40 and, thence, via outflow 48 to milk manifold 20.

METERING DISCS

Lower metering disc 50 is pierced by metering aperture 70. It is this aperture that ultimately limits the flow through drain 44. It is sometimes convenient to provide a second metering aperture 71 as seen in FIG. 2c. As can be seen from FIGS. 2a and 2c, the floor of chamber 30 has a concave portion 72 that immediately surrounds drain 44. Concave portion 72 provides clearance so that milk passing through metering aperture 70 is able to flow out of drain 44. Concave portion 72 may be provided by bevelling the shoulder defined by metering drain 44 and the floor of chamber 30 out to a radius that exceeds the distance from aperture 70 to the center of disc 50.

Referring to FIG. 3, it is seen that the lower surface 76 of upper metering disc 52 is surrounded by peripheral annular ridge 80. Ridge 80 contains a plurality of notches 84, so that when upper metering disc 52 confronts lower metering disc 50, a plurality of orifices is defined. Each of said orifices is of a cross sectional area approximately half that of metering aperture 70. Due to the large number of these orifices, metering aperture 70 remains the ultimate limitation on flow. The relatively small size of the orifices tends to insure that metering aperture 70 is not blocked by any solid particles present in the milk, since any such particles reaching aperture 70 would have had to pass through an aperture only half the size. Thus while some of the orifices may become clogged during operation, operation remains relatively unimpaired so long as a reasonable fraction of the orifices remain open.

CLEANING MODE

Vertical guide rod 54, itself coaxial with metering disc 50 and 52, has threaded into its tapered lower portion 96 a smaller diameter rod passing through central holes 88 and 90 in metering disc 52 and 50 respectively and extending downwardly into metering drain 44. Rod 84 is of a small enough diameter that it does not impede flow through drain 44. Holes 88 and 90 which play no significant role in the metering function, are of a size to permit metering discs 50 and 52 to slide freely along rod 84. The lower end of rod 84 is flared outward to define head 92. Head 92 is of a diameter larger than that of hole 90, so that upward movement of rod 84 causes head 92 to engage the portion of the lower surface of metering disc 50 that immediately surrounds hole 90. Thus, a lifting is accomplished. Surrounding rod 84 and located in the space between metering disc 50 and metering disc 52, is retaining washer 94 which is of a diameter greater than that of hole 88. Thus, upward movement of rod 84 causes retaining washer 94 to engage the portion of the lower surface of metering disc 52 that immediately surrounds hole 88. This effects a separate lifting of metering disc 52 away from metering disc 50 which is free to slide along rod 84 until it is engaged by head 92. When the metering discs are together at their lowest position, tapered end 96 of guide rod 54 seats against the shoulder defined by hole 88 and the upper surface of upper metering disc 52, thereby sealing hole 88. Location of washer 94 can be chosen so that it seals off hole 90 when tapered end 96 is seated on hole 88. If hole 90 is not thus sealed, the clearance space in hole 90 about rod 84 merely serves as an additional metering aperture if it is significant at all.

Thus, when it is time to flush chamber 30 with water, as for example at the completion of the milking cycle, handle 56 is drawn upward, thereby causing rod 84 to move upward and accomplish the lifting and separating described above. When metering disc 50 and 52 are thus separated, the orifices that would be otherwise difficult to clean, revert to their character as notches that are open to the cleansing water. Metering aperture 70, itself twice as large as the orifices, is exposed to the turbulent water without any confronting surfaces or barriers to impede the cleansing action. All this is accomplished without having to disassemble the device.

What is claimed is:

1. A flow sensing device comprising: a chamber having a floor with a drain therein, an upper portion, and a lower portion; an input conduit communicated to said upper portion; an outflow conduit communicated to said drain; an overflow conduit communicating said upper portion to said outflow conduit; means to sense the level of liquid in said chamber; a first metering disc overlying said drain, said first metering disc having upper and lower surfaces and a metering aperture between said surfaces of said first metering disc for defining the flow of liquid to said drain; a second metering disc overlying said first metering disc, said second metering disc having a lower surface, means for defining a peripheral annular extending ridge surrounding said lower surface of said second metering disc when said second disc is confronted to said upper surface of said first metering disc, said defined ridge having a plurality of notches therein, said notches being smaller than said metering aperture whereby said peripheral annular ridge defines a plurality of orifices when said second metering disc overlies said first metering disc so that said peripheral annular ridge confronts said upper surface of said first metering disc; means for raising said first metering disc relative to said floor; and means for separating said metering discs by raising said second metering disc relative to said first metering disc.

2. The invention of claim 1 wherein said means for sensing the level of liquid comprises: a vertical rod; a float freely movable along said rod; a magnetic reed switch located inside said rod; and a magnet located inside said float.

3. The invention of claim 1 wherein said first and second metering discs have respectively first and second axial holes; wherein said first disc raising means includes a vertical rod passing through said axial holes for a sliding fit, a head at the lower end of said rod of a diameter larger than that of said first axial hole, and a handle at the upper end, said rod being capable of upward movement; and wherein said second disc raising means includes a protrusion on said rod, said protrusion extending to a diameter greater than that of said second axial hole, and said protrusion being a distance above said head that exceeds the distance from first disc's lower surface to lower surface of said second disc when said discs are confronting, whereby said upward movement of said rod first lifts said second metering disc and subsequently lifts said first metering disc.

* * * * *